March 20, 1945. E. AGHNIDES 2,372,043
MOTOR VEHICLE
Filed May 5, 1942 3 Sheets-Sheet 1
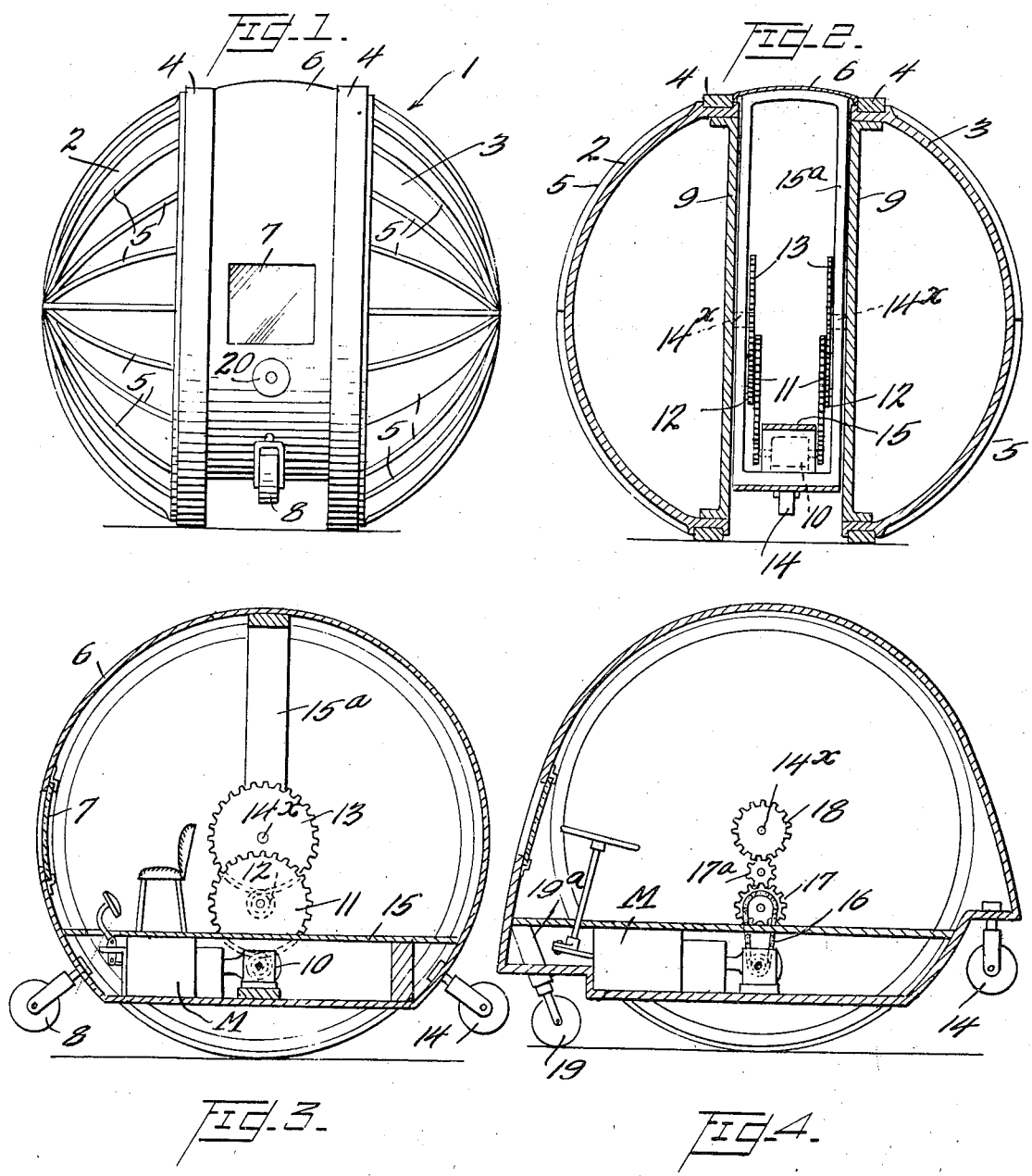
Inventor
Elie Aghnides
By John Boyle Jr
Attorney

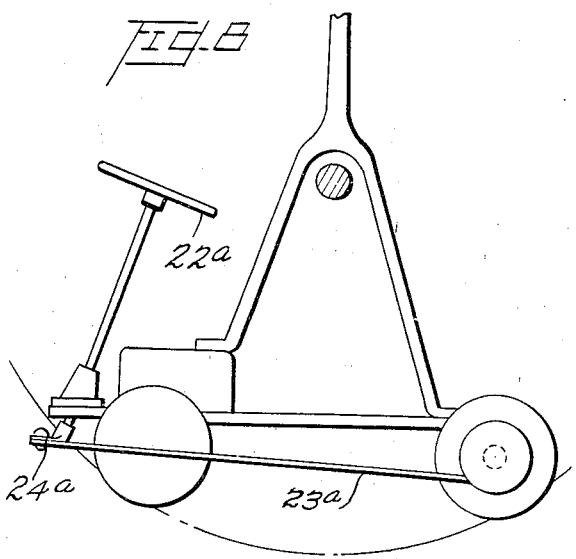
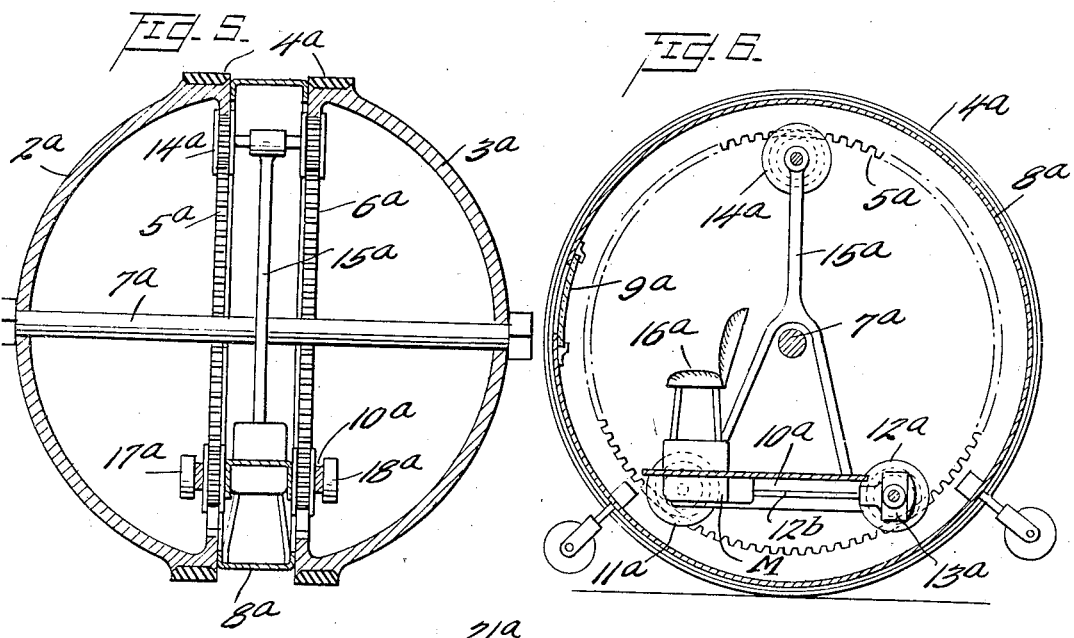

March 20, 1945.　　　E. AGHNIDES　　　2,372,043
MOTOR VEHICLE
Filed May 5, 1942　　　3 Sheets-Sheet 3
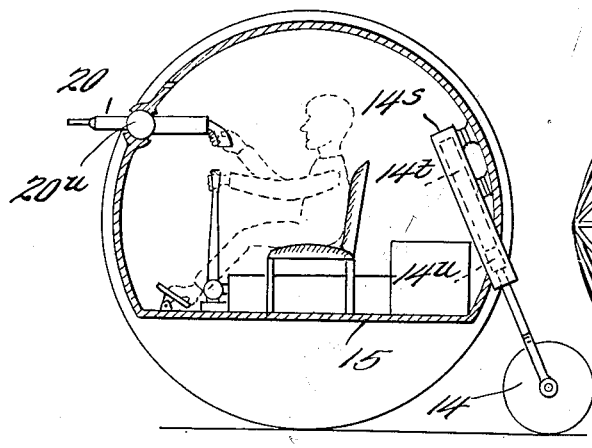
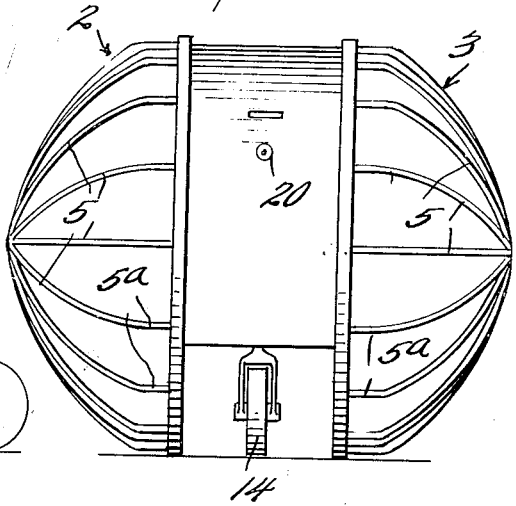
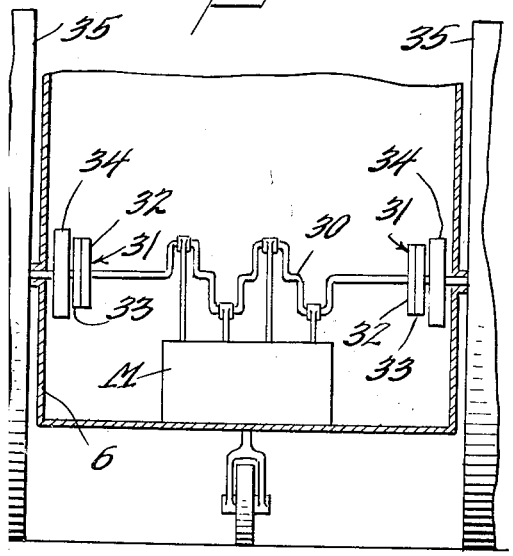
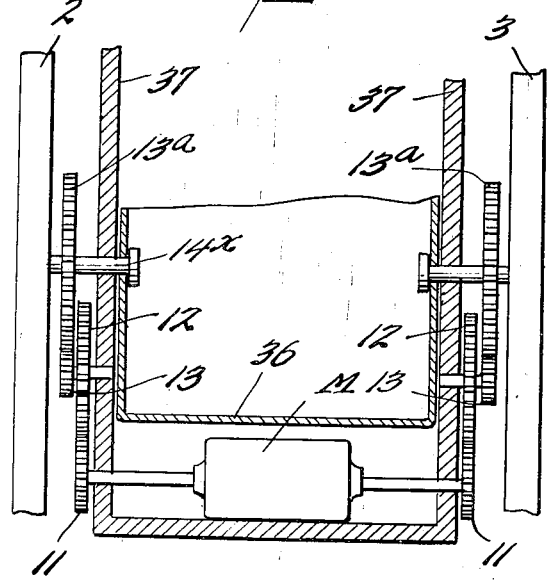
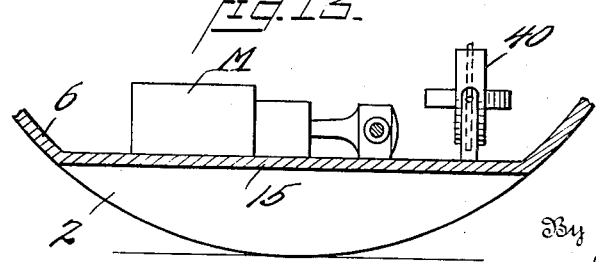
Inventor
Elie Aghnides
By John Boyle Jr.
Attorney Patented Mar. 20, 1945

2,372,043

UNITED STATES PATENT OFFICE 2,372,043

MOTOR VEHICLE

Elie Aghnides, New York, N. Y.

Application May 5, 1942, Serial No. 441,845

13 Claims. (Cl. 180—17)

My invention relates to a new type of motor vehicle and while the principle is of general application, it is particularly advantageous for use as an army tractor and new type of combat vehicle. The vehicle can be used on land, or can be made with sufficient inherent buoyancy that it will float in water, and can be propelled through the water.

Some of the advantages of my invention may be enumerated as follows: Since the tank is uniformly armored and with a minimum amount of articulation, there are no specially vulnerable parts. If forced to fall on its side, it will automatically recover its normal upright position. It can be steered or turned around in a small area thus giving a wide range of fire with a single gun. The turning to the right or the left can be effected at such a sharp angle that the vehicle can spin as closely as the rotation of one foot of a drawing compass around the other foot. As a result the tank can turn around and go back if it finds itself in a narrow path leading to a dead end or to a concentration of superior enemy forces. It is easily maneuvered so that the driver can also serve as a gunner. Sphericity of surfaces increases the resistance to destruction and deflects projectiles. The side portions being hemispheroidal, the vehicle, should it fall on its side, will instantly recover its normal position, the center of gravity of the vehicle being below the center of its height. The hemispheroidal side portions are provided with ribs or mud hooks, which when the tank is engaged in mud, snow or sand will serve as traction increasing means. These ribs running from the tread to the apex of each of the hemispheroidal portions will help the tank to get out of a ditch whereas no other known vehicle has traction means on the side. The conception of this vehicle is such that the number of parts used for its construction is very much reduced, so that the parts are stronger and will resist destruction. Moreover, on a muddy terrain it will move when the usual tank will be jammed and immobilized.

Generally speaking, the tank of my invention comprises an armored chamber which carries the engine, crew and guns. This chamber is located between the two wheels, the outer parts of which are hemispheroidal. The chamber has its center of gravity below the center of the sphere so that the tank always tends to right itself if it falls on its side. In one embodiment of the present invention two trailer wheels are secured to the armored chamber, one of which is in front and contacts the ground when going downhill and the other is in the rear and contacts the ground when going uphill. In another form or embodiment a single trailer wheel is employed.

Referring to the drawings for a more complete disclosure of the invention—

Figure 1 is a front elevation of one form of vehicle;

Fig. 2 is a vertical transverse section of Fig. 1;

Fig. 3 is a vertical longitudinal section of Fig. 1;

Fig. 4 is a vertical longitudinal section of a modified form;

Fig. 5 is a vertical transverse section of a modified form;

Fig. 6 is a vertical longitudinal section of Fig. 5;

Fg. 7 is a plan view of the carrier shown in Fig. 6;

Fig. 8 is a modified form of carrier;

Fig. 9 is a vertical longitudinal section of a modified form;

Fig. 10 is a front elevation of a modified form;

Fig. 11 is a fragmentary vertical transverse section of a modified form;

Fig. 12 is a fragmentary vertical transverse section of a modified form;

Fig. 13 is a fragmentary vertical longitudinal section of a modified form.

Referring to Fig. 1, the body 1 is generally spheroidal in shape and is made in three parts 2, 3 and 6, the parts 2 and 3 revolving wheel-like relative to the body 6. On the outside and around the parts 2 and 3 is a tread 4 and ribs 5 which may act as mud hooks on land or as propellers in the water. The space between the two hemispheroids is closed by the body 6 having a window 7 therein. Secured to the body 6 in front, is a trailer wheel 8, and on the rear is a trailer wheel 14 that are used when descending or ascending an incline respectively. As shown in Fig. 2, the hemispheroids may be hollow and closed by the plate 9 so that when in the water the vehicle will be buoyant. The hollow part can be divided into water tight compartments.

For propelling the vehicle, I may employ reduction gearing as shown in Figs. 2 and 3, wherein a motor M, mounted within the body 6 drives through the differential 10, gearing 11, 12 and 13, the last being keyed to the axle 14x, which is carried by the plate 9, which in turn is integrally connected to the hemispheroidal parts 2 and 3. The rear trailer wheel 14, which contacts the ground when climbing, prevents rotation of the body 6 around the axle as the back trailer wheel 14 touches the ground, the platform 15 at that time being no longer horizontal. The motor and gearing are carried by the frame 15a, of the body 6, which is pivotally hung on the stub axles 14x.

In the form shown in Fig. 4, the transmission from the differential may be through the chain and gears 16, 17, 17a and 18, the last gear being keyed to the axle 14x. The front trailer wheel 19 may be provided with a spring shock absorber 19a. When the gun 20 (Fig. 1) is discharged, the platform has a tendency to rotate counterclockwise around the axle so that when mounted, as shown, this tendency to rotation is absorbed. The front trailer wheel can be retractable. It can also be lowered at will so as to permit the body to partially rotate in order that the gun may be directed skyward.

Referring to Figs. 5 and 6, on the outside and around each part 2a and 3a is a rubber tread 4a and on the inside are annular gears 5a and 6a. Connecting the two hemispheroids is an axle 7a about which they can independently rotate. The space between the two hemispheroids may be closed by a metal plate 8a supported by the carrier 10a and it may have a window 9a therein.

As shown in Figures 6 and 7, the carrier 10a is provided with driving gears 11a and 12a, the latter being driven in the usual manner through the transmission shaft 12b from a motor M, and the usual differential gearing, the housing 13a therefor only being shown. The gears 11a and 12a of the carrier mesh with the annular gears 5a and 6a, as well as the stability or safety wheels 14a which are carried by the frame 15a that is monuted on the carrier. A seat 16a may be provided for the occupant. It will be understood that the two hemispheroidal parts 2a and 3a rotate about the axis 7a independently of each other.

In order to steer the vehicle, by applying a brake to the drive shaft at one side of the differential (Fig. 7), the other side will continue to rotate as well as the corresponding hemispheroid and in this way a sharp angle turn of the vehicle can be made. Various steering arrangements can be effected for this purpose. As shown in Fig. 7, brake drums 17a and 18a may be mounted on the rear axle of the carrier and operated through the independent brake pedals 19a and 20a connected to the brakes by connecting links 21a. Instead of brake pedals, the brakes can be operated through wheel 22a, Fig. 8, which rotates to the right and left, to put on the right and left brakes respectively, motion being transmitted through the links 23a on each side and which are pivoted to the steering arm 24a.

In the modification shown in Fig. 9, the body is provided with a single rear trailer wheel 14, provided with a shock absorber 14s. This may be formed by an air chamber 14t in which moves the piston 14u. When used as a one man tank, the gun 20 may be mounted by means of the universal joint 20u in the body portion 6.

In the modification shown in Fig. 10, the wheel portions 2 and 3 are not entirely hemispheroidal and the ribs 5 have parallel portions 5a. An oval shaped tank, forced on its side will recover even easier, its normal position, and the parallel ribs 5a will give greater traction, than in the form as shown in Fig. 1.

In the modification shown in Fig. 11, the vehicle is propelled and steered through a fluid drive. The motor M is carried by the body 6 and on the crank shaft 30 is the fluid drive 31. This drive has one part 32 cooperating with the adjacent part 33. Two brakes 34, one at either side can be independently operated to retard or immobilize the part 33 to similarly retard or immobilize the adjacent wheel 35 and in this manner the vehicle can be steered. By such a construction, the differentials and gear boxes are dispensed with. It will be understood that other brakes may be used for stopping or retarding movement of the vehicle. This arrangement can be utilized in the construction of a simplified automobile or war vehicle.

In the modification shown in Fig. 12, the usual motor M, drive gearing 11, 12, 13 and 14, propeller wheels 2, 3 are provided, and in addition the self-levelling platform 36 is pivotally suspended from the frame 37 for stability.

In the modification shown in Fig. 13, a stabilizing gyroscope 40 is mounted on the platform 15 of the body 6. As the wheels 2 and 3 rotate, there is a tendency for the body 6 to rotate around the axle. This can be prevented by the use of trailer wheels or a gyroscope. These two different means can be used separately or in association with each other.

This application is a continuation in part of my application Ser. No. 406,689, now abandoned.

I claim:

1. A vehicle comprising rotary and substantially hemispheroidal propelling members, a body member between said rotary members, a motor adapted to transmit power to the rotary members, means for controlling displacement of the motor relative to the rotary members, and means for controlling rotation of the propelling members at relatively different speeds to effect steering of the vehicle.

2. A vehicle comprising rotary and substantially hemispheroidal propelling members, a body member between said rotary members, a motor for driving said rotary members, means for transmitting power from the motor to the rotary members to effect locomotion of the vehicle, means for controlling the rotational displacement of the body member relative to the rotary members and means for controlling rotation of the propelling members at relatively different speeds to effect steering of the vehicle.

3. The vehicle of claim 1 in which the means for controlling the displacement of the motor comprises a trailer wheel which normally is in contact with the ground and is located at the rear of the vehicle.

4. The vehicle of claim 1 in which the rotary propelling members are each provided with exterior ribs extending from the part of largest diameter to the apex of the hemispheroidal members.

5. The vehicle of claim 2 in which the means for transmitting power from the motor through a crank shaft to the rotary propelling members comprises a fluid drive connection between the shaft and each of the rotary members, and steering brakes between each fluid drive connection and the rotary members.

6. A vehicle comprising two rotary substantially hemispheroidal propelling members, a body member supported between said rotary members, a motor supported within the said body member and adapted to transmit power to the rotary members, means for controlling the displacement of the motor relative to the rotary members, means for controlling rotation of the propelling members at relatively different speeds to effect steering of the vehicle, the center of gravity of the vehicle as a whole being below the center of the propelling members to aid recovering its upright position when the vehicle falls on its side.

7. The vehicle of claim 1 in which the rotary propelling members are of hollow and water tight construction and effect sufficient displacement to float the vehicle in water.

8. The vehicle of claim 2 in which the means for transmitting power from the motor through a crank shaft to the rotary propelling members comprises two fluid drives each between the shaft and the rotary members and two steering brakes, each between the fluid drive and the rotary members, the means for controlling the displacement of the motor comprising at least one wheel located at the rear of the vehicle.

9. In a self-propelled vehicle comprising a pair of load-supporting, ground-engaging, wheel-like elements and an intervening body member supported jointly by the said elements and a ground-engaging wheel positioned to control the rotational displacement of the said body member relative to the said elements, each of said elements being substantially hemispheroidal in shape thus presenting laterally extended surfaces to resist penetration and to afford increased ground engaging surfaces when maneuvering over soft or sandy soil.

10. The combination of claim 9, in which the diameter of the wheel-like elements is substantially that of the over-all height of the vehicle, the said elements being of hollow construction for buoyancy and provided with exterior ribs which radiate from the horizontal axis to points adjacent the perimeter of the elements, the said ribs functioning to increase traction in soft ground and also to propel the vehicle when travelling over water.

11. The combination of claim 9, in which the mass of the vehicle is so distributed that its center of mass is beneath the horizontal axis of rotation of the said elements, whereby gravitational force tends to right the vehicle by a rolling action in event it falls or rolls on to its side.

12. In a vehicle having at least two load-supporting wheels, each comprising a normal rolling surface or tread, and a laterally extending substantially hemispheroidal tread or surface portion adapted to increase the effective ground contacting area of the wheel when operating over mud, snow or sand.

13. The combination of claim 12 in which the hemispheroidal portions of the wheels are provided exteriorly with traction increasing ribs or cleats.

ELIE AGHNIDES.